(12) United States Patent
Thorat et al.

(10) Patent No.: US 10,926,205 B2
(45) Date of Patent: Feb. 23, 2021

(54) CAST FILTER ASSEMBLY-MODULAR DESIGN

(71) Applicant: Eaton Intelligent Power Limited, Dublin (IE)

(72) Inventors: Kumar Chandrakant Thorat, Pune (IN); Mark A. Levis, Belmar, NJ (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 919 days.

(21) Appl. No.: 15/627,611

(22) Filed: Jun. 20, 2017

(65) Prior Publication Data

US 2018/0361282 A1   Dec. 20, 2018

(51) Int. Cl.
| | |
|---|---|
| *B01D 35/12* | (2006.01) |
| *B01D 35/30* | (2006.01) |
| *B01D 35/157* | (2006.01) |
| *B01D 24/10* | (2006.01) |
| *B01D 29/23* | (2006.01) |

(52) U.S. Cl.
CPC ............ *B01D 35/12* (2013.01); *B01D 24/10* (2013.01); *B01D 29/23* (2013.01); *B01D 35/1573* (2013.01); *B01D 35/30* (2013.01); *B01D 2201/165* (2013.01); *B01D 2201/30* (2013.01); *B01D 2201/301* (2013.01)

(58) Field of Classification Search
CPC .... B01D 35/12; B01D 35/1573; B01D 35/30; B01D 24/10; B01D 29/23; B01D 2201/165; B01D 2201/301; B01D 2201/30

USPC ................. 210/232, 340, 341, 240
See application file for complete search history.

(56) References Cited

U.S. PATENT DOCUMENTS

| | | | | |
|---|---|---|---|---|
| 3,768,654 | A * | 10/1973 | Pearce ................... | B01D 35/12 210/232 |
| 5,201,423 | A * | 4/1993 | Rienecker ............ | B01D 29/117 209/273 |
| 5,443,722 | A * | 8/1995 | Desai .................... | B01D 29/35 137/625.21 |

(Continued)

FOREIGN PATENT DOCUMENTS

| | | |
|---|---|---|
| EP | 1 263 518 B1 | 4/2004 |
| EP | 1 189 672 B1 | 12/2005 |
| GB | 2 289 930 A | 12/1995 |

*Primary Examiner* — Thomas M Lithgow
(74) *Attorney, Agent, or Firm* — Fay Sharpe LLP

(57) ABSTRACT

A filter assembly has a one-piece cast metal pressure vessel with an inlet port communicating only with an inlet chamber and an integral offset bulkhead forming a separate filtrate chamber on the opposite side of the bulkhead having an upper exit port and lower exit port on opposite sides of the filtrate chamber. A filter assembly is disposed through an aperture in the bulkhead with the filter inlet side communicating only with the inlet chamber and the filter outlet side communicating only with the filtrate chamber. An access opening is provided in the top of the pressure vessel with a lid for changing filters. A closure member attached over the lower exit port configures the assembly for simplex operation. Relocating the closure member to cover the upper exit port on a pair of the pressure vessels with filters therein readily configures the pair for attachment to opposite sides of a central diverter valve for duplex filtering operation without rework of either of the pair of pressure vessels.

19 Claims, 8 Drawing Sheets

(56) References Cited

U.S. PATENT DOCUMENTS

| | | | |
|---|---|---|---|
| 6,197,195 B1* | 3/2001 | Booth | B01D 29/35 210/340 |
| 8,961,792 B2* | 2/2015 | Desai | B01D 35/12 210/340 |
| 9,630,127 B2* | 4/2017 | Hoots | B01D 35/30 |
| 2003/0010697 A1 | 1/2003 | Sann et al. | |
| 2013/0061968 A1* | 3/2013 | Schlichter | F16K 35/14 137/862 |

* cited by examiner

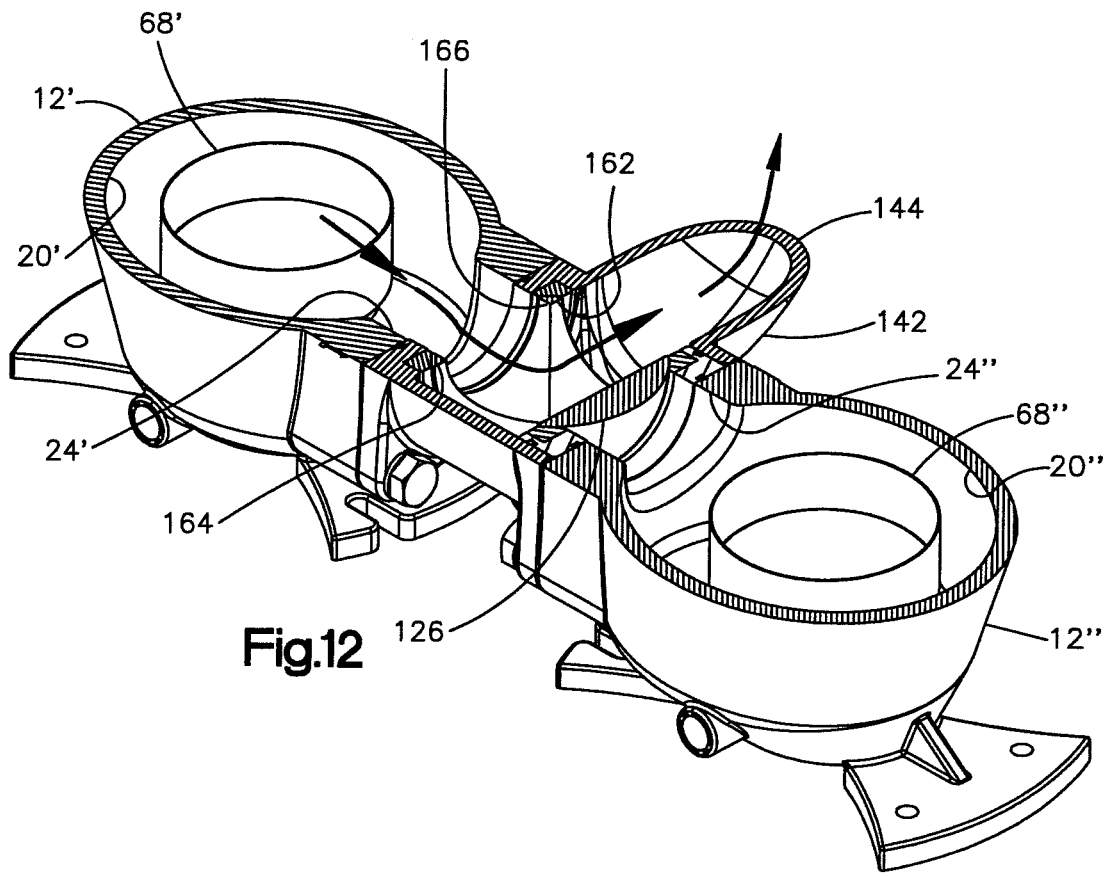
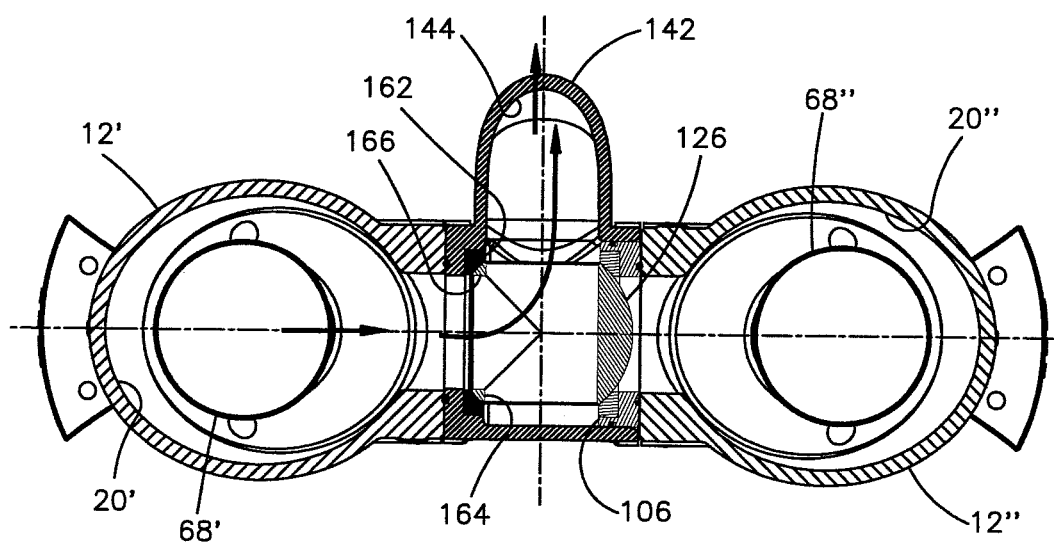

CAST FILTER ASSEMBLY-MODULAR DESIGN

BACKGROUND

The present disclosure relates to fluid filtration in systems employed commercially for filtering water and other fluid processing systems in which a relatively large volume of fluid is required to be filtered before discharge to the environment or recirculation in a closed operating system. Typically, systems of this type employ a pressure vessel with a removable closure or lid and utilizing a filter cartridge or basket containing filtering media and which is employed in a flow-through arrangement from an inlet to an outlet thereon provided for attachment to system fluid flow conduits.

This disclosure particularly relates to filtration systems of the type operating at system pressures up to 16 bar and fluid temperatures of 160° C. with inlet nozzles in the range of 2.5 to 15 cm and flows in the range of 380-3800 liters/minute.

In service, it has been found necessary to periodically either backwash or replace the filter unit within the pressure vessel in order to prevent clogging of the filter media and thus prevent a significant increase in the pressure drop across the filtration unit.

Filtration systems which employ internal apparatus for backwashing the filter have been found to be one way or means of preventing clogging of the filter unit. However, in order to accomplish backwashing without completely stopping flow of filtrate which is particularly necessary in closed loop systems, the apparatus required to accomplish the backwashing had been found to be complex and relatively costly.

Alternatively, in order to eliminate the requirement of shutting down the system and depressurization of the filter vessel for removal and replacement of the filter element, dual filtration/pressure vessels have been employed with a common inlet diverter valve. This arrangement permits switching the inlet flow from one of the filtration units to the other to enable continuation of filtrate flow while one unit is depressurized and the filter unit removed and replaced. The diverter valve may then redirect flow to the newly replaced filter unit and the second unit depressurized and the filter replaced therein. However, in providing such duplex or dual filter system, it has been required to manufacture and install two completely separate filter units or fabricate a unique dedicated structure with separate pressure chambers for dual filters which has increased the cost of the system.

Heretofore, such commercial filtration units are typically constructed with a tubular or cylindrical pressure vessel member having circular flanges welded thereto for internally mounting the filter unit and for attachment of the cover or closure (lid) at one end and for attaching a closed end of the filter vessel typically by weldment. This type of construction is relatively expensive to manufacture, requiring several of the elements to be machined prior to attachment to the cylindrical pressure vessel.

It has thus long been desired to provide a robust dual filter fluid filtration system permitting switching between the units to permit depressurization and replacement of the filter element and which is competitive in cost and service with systems employing a single filter unit with a mechanized backwashing system.

The aforesaid type of filtration systems may also be employed with a single pressure vessel and filter unit in a simplex configuration where it is acceptable to stop the filtration, depressurize the pressure vessel, remove the closure, and replace the filter element.

BRIEF DESCRIPTION

The present disclosure provides a solution to the above-described problem of enabling filtration of fluid in a continuous flow arrangement whereby dual filter vessels are provided where the flow may be diverted from one filter to the other to permit depressurization and removal and replacement of the one filter unit which flow is continued through the other filter unit. Subsequently, flow is re-diverted to the newly replaced filter and the second filter vessel is then depressurized and the filter therein replaced.

The filtration unit of the present disclosure provides a pressure vessel which is formed as a single one-piece member by metal casting; and, the filter may be operated in a simplex arrangement or a duplex arrangement in which the dual pressure vessels are identical to and are of the same one-piece cast construction as the pressure vessel employed in the simplex arrangement. The filtration assembly of the present disclosure thus eliminates the need for the manufacture of separate pressure vessel arrangements and by eliminating the requirement for several machined parts and provides a system which has a significantly reduced manufacturing cost. The one-piece cast filtration assembly may also be used in a simplex arrangement and the one-piece cast pressure vessel is configured such that at a later time, a second identical pressure vessel can be connected with the diverter valve to provide duplex filtering without the need to alter the simplex cast one-piece filter vessel.

In the manufacture of the one-piece cast pressure vessel for the system of the present disclosure, it has been found advantageous to configure the pressure vessel chambers of the one-piece cast vessel with an ellipsoidal cross-section for which it has been found that improved flow characteristics are provided resulting in a significant decrease in the pressure drop across the unit from inlet to outlet.

The filtration assembly or apparatus of the present disclosure thus provides a single cast metal one-piece filter vessel with attachment fittings arranged such that the unit may be operated in simplex configuration with a single filter in the system or connected to a diverter valve with identical duplicate one-piece cast filter vessels without requiring rework of the filter vessel.

BRIEF DESCRIPTION OF THE DRAWINGS

FIG. 12 is a perspective view of a section view taken along section indicating lines 12-12 of FIG. 4 with the diverter valve rotated 180° with respect to the position shown in FIG. 3 and shows the lower valve member positioned to direct flow out of the left-hand filter pressure vessel to the system outlet; and, FIG. 13 is a plan view or top view of the section of FIG. 12.

DETAILED DESCRIPTION

Figure 1:
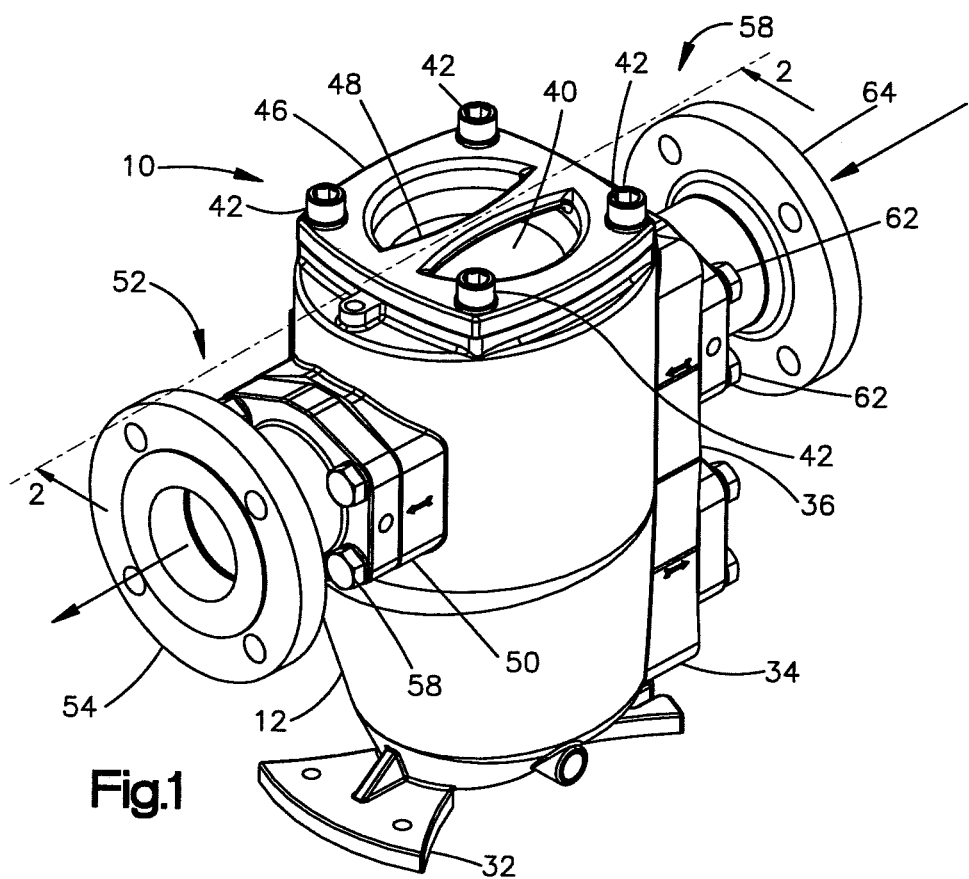
FIG. 1 is a perspective view of a single or simplex filtration assembly employing the one-piece cast pressure vessel of the present disclosure.
Figure 2:
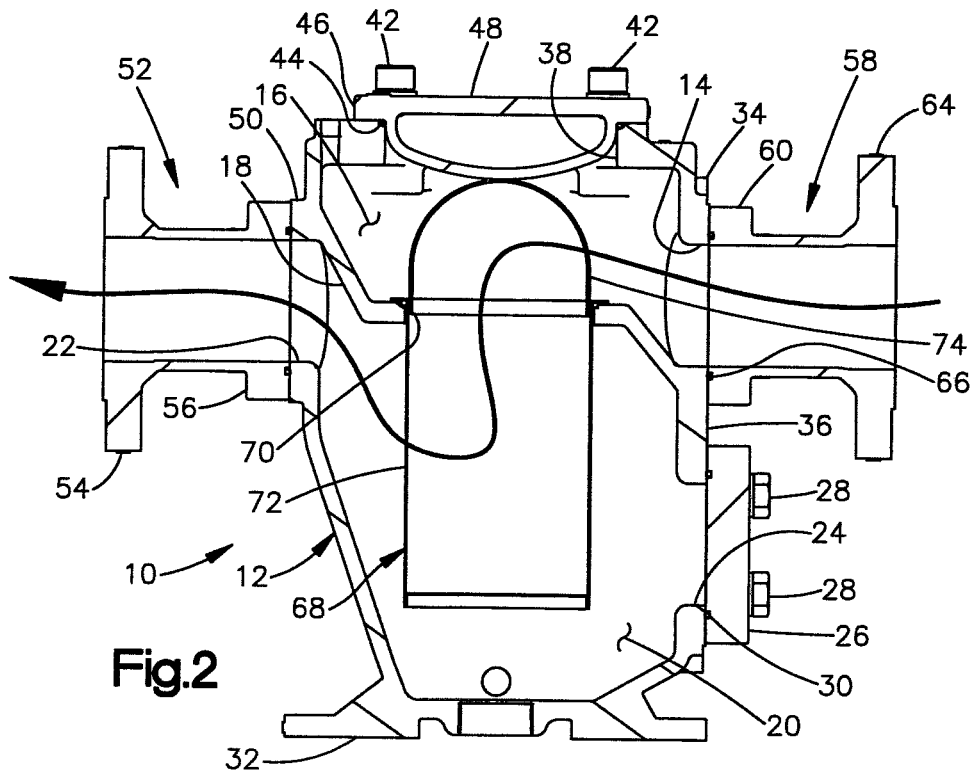
FIG. 2 is a cross-sectional view taken along section indicating lines 2-2 of the assembly of FIG. 1.

Referring to FIGS. 1 and 2, a filtration assembly in a simplex arrangement is indicated generally at 10 with the flow therethrough indicated by the black arrows in FIG. 1 and the continuous flow line in FIG. 2. The assembly 10 has a pressure vessel 12 with an inlet port 14 permitting flow to an inlet chamber 16 formed above a bulkhead or partition 18 separating the inlet chamber 16 from an outlet chamber 20 having an upper outlet port 22 and a lower outlet port 24 which is formed on a side opposite outlet port 22 and below inlet port 14. The bulkhead 18 is thus offset vertically from one side of the pressure vessel to the other and is cast integrally with the wall of the pressure vessel such that the inlet port 14, as shown in FIG. 2, is aligned with the upper outlet port 22. Outlet port 24 has a closure member 26 received thereover and secured by fasteners 28 and is sealed thereover with a seal ring 30. The pressure vessel 12 is formed integrally as one-piece of cast or molded metal integrally including the partition 18, the ports 14, 22, 24, and a supporting base portion 32 provided on the lower outer extremity of the pressure vessel.

As shown in FIG. 1, the inlet port 14 and the outlet port 24 have a common boss 34 formed integrally thereabout on the exterior of the pressure vessel during casting of the pressure vessel; and the ports have a common planar face 36 for facilitating attachment thereto as will hereinafter be described in greater detail.

The pressure vessel 12 has an access opening 38 formed in the upper wall of the inlet chamber 16, which opening 38 has received thereover a closure or lid 40 which is secured thereon by suitable fasteners 42 such as socket head cap screws and sealed thereabout by a seal ring 44.

In the present practice, the closure 40 is a cast metal member having an attachment flange 46 and crossbar handle 48 for facilitating removal.

In the present practice, the upper outlet port 22 terminates in an integrally cast attachment boss 50 which has attached thereto an optional outlet fitting, indicated generally at 52, which has a circular flange 54 at its outer end, the fitting also having an attachment flange 56 at its inner end which is secured over the boss 50 by suitable fasteners 58. The outlet fitting may be employed to facilitate attachment to a filtrate discharge conduit (not shown).

The inlet port 14 may also have an optional attachment fitting, indicated generally at 58, received thereover with an inner flange 60 formed on fitting 58 which flange is attached onto the face 36 of the boss 34 and secured thereon by suitable fasteners 62. The fitting 58 also has an outer circular flange 64 which is adapted for connection to an inlet conduit (not shown). The inner flange 60 of fitting 58 is sealed over the inlet port 14 by a suitable seal ring 66 as shown in FIG. 2. In the present practice, it has been found convenient to form flange 60 as an SAE type.

Referring to FIG. 2, a filter assembly indicated generally at 68 is received through an aperture 70 formed through the offset bulkhead or partition wall 18 such that the filter 68 has its inlet exposed to the inlet chamber 16 but isolated from the chamber 16 by bulkhead 18. The filter assembly 60 may comprise a porous basket with filter media therein. Fluid entering the fitting 58 and port 14 must flow interiorly of the filter 68 through the open upper end thereof exposed to chamber 16; and, the fluid must pass through the filter media contained therein and outwardly through basket 72 of the filter assembly 68 as clean filtrate into chamber 20 and then exits the vessel through the port 22 and fitting 52. It will be understood that the fasteners for attaching the outlet and inlet fittings 52, 58 to the pressure vessel bosses 50, 34, respectively, have been omitted in FIG. 2 for simplicity.

In the present practice the filter 68 includes a handle 74 for facilitating removal of the filter through the access port 38. It will be understood that pressure on the inlet side of the filter forces basket ring 72 down on inner groove of partition wall 18 to provide effective sealing on the bulkhead.

Figure 3:
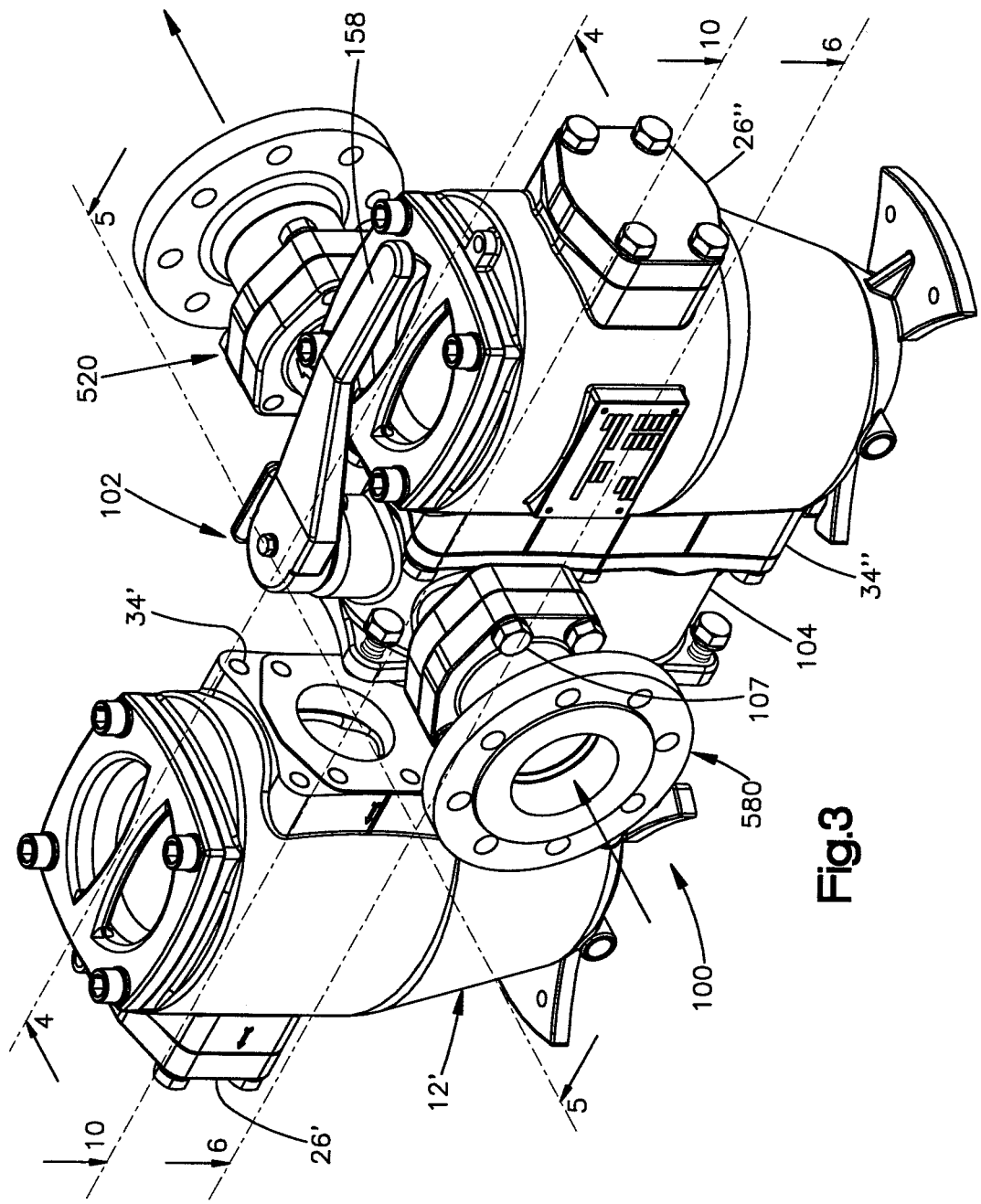
FIG. 3 is a perspective view of a duplex arrangement of the filtration system of the present disclosure employing dual filter media elements each in an identical side-by-side one-piece cast metal pressure vessel with the left-hand filter vessel shown detached from the centrally disposed diverter valve.
Figure 4:
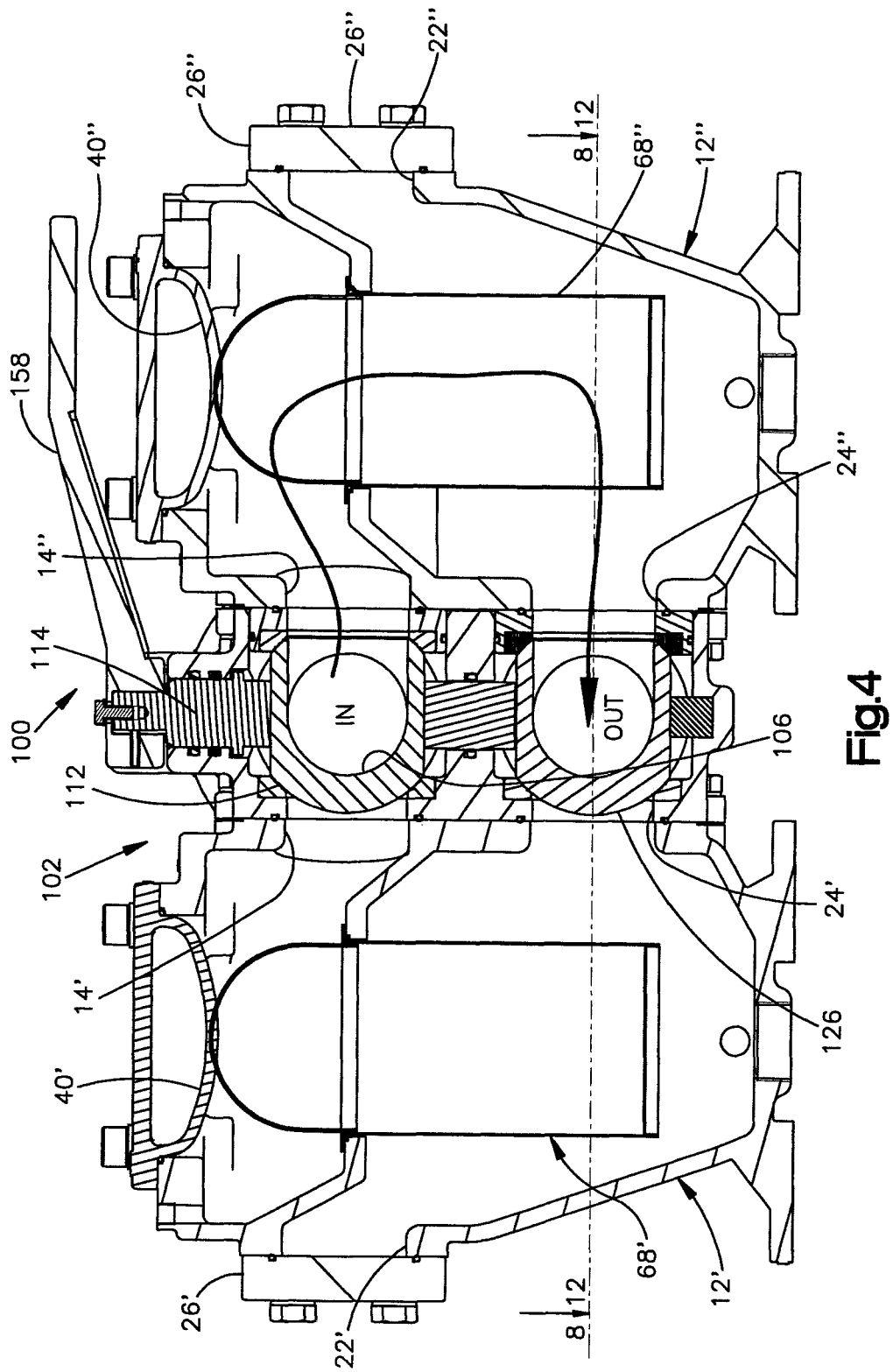
FIG. 4 is a sectional view taken along section indicating lines 4-4 of FIG. 3 with the left hand filter attached to the centrally positioned diverter valve.
Figure 5:
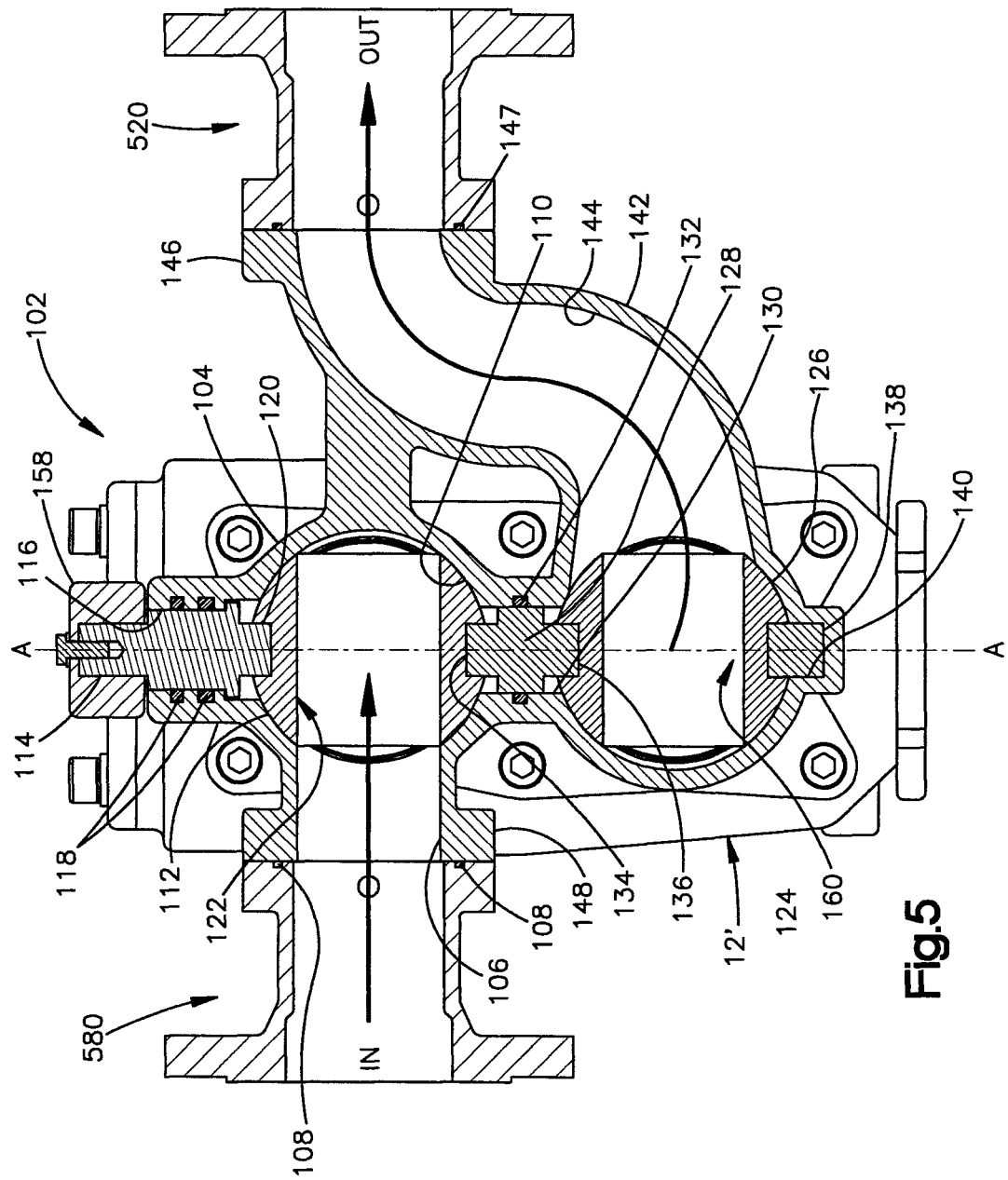
FIG. 5 is a section view taken along section indicating lines 5-5 of FIG. 3.

Referring to FIGS. 3, 4, and 5, a duplex arrangement of the filtration assembly of the present disclosure is indicated generally at 100 and includes the pair of identical duplicate filter vessel assemblies noted respectively 12' and 12" for the left-hand and right-hand pressure vessel assemblies which are attached on opposite sides of a diverter valve assembly indicated generally at 102. In the arrangement of the duplex filtration assembly 100, both of the pressure vessel assemblies 12 have the closure 26', 26" respectively, for the lower exit port 24', 24" respectively relocated to close the outlet port 22'. 22" respectively, leaving the outlet port 24', 24" open. Thus, a pair of the integrally cast pressure vessel 12 with filter assembly 68 therein, employed in a simplex configuration as shown in FIGS. 1 and 2 may be readily connected for duplex filtering simply without rework by relocating the closure for the lower discharge port to cover the upper discharge port on the opposite side of the pressure vessel.

Diverter valve 102 is formed with a valve block 104 which has an inlet port 106 and has an optional inlet fitting 580 attached by fasteners 107 over integral flange 148 surrounding the port 106 and sealed thereon by suitable seal ring 108. The inlet port 106 communicates with a chamber 110 formed in the valve block which chamber 110 has a generally spherical configuration. Chamber 110 has received therein a spherical inlet valve member 112 which valve member 112 is rotatably disposed in the chamber 110 for rotation about an axis denoted A-A in FIG. 5. The valve member 112 is engaged drivingly on its upper surface by a driving operator member 114 which is rotatably disposed in bore 116 provided in the upper surface of the valve block 104; and, the member 114 is rotatably sealed therein by suitable seal rings 118. The lower end of the operating member 114 has a projection 120 provided thereon which drivingly engages corresponding surfaces provided in the valve member 112 for effecting rotation of the valve member 112 upon rotation of the member 114 as will hereinafter be described. Valve member 112 has a cross-passage indicated generally at 122 in FIG. 5 which will be hereinafter described in greater detail with respect to the operation of the valve.

The valve block 104 has a lower outlet chamber indicated at 124 which has generally spherical configuration and has received therein a lower spherical valve member 126 which is operably disposed to be rotated about the axis A-A. The lower valve member 126 is below and spaced from the upper valve member 112 and is rotatably connected thereto by an intermediate driving member 128 rotatably disposed in a second bore 130 formed in the valve block coaxially with bore 116; and, the driving member 128 is rotatably guided therein and sealed thereabout by a suitable seal ring 132. Driving member 128 has a projection 134 in the upper surface thereof which drivingly engages corresponding surface formed or provided in the lower side of upper valve member 112 such that rotation of valve member 112 about the axis A-A effects rotation of the driving member 128. The intermediate driving member 128 has on its lower end a projection 136 which drivingly engages correspondingly configured surfaces formed or provided in the upper side of the lower valve member 126 such that, upon rotation of the upper driving member 114 and upper valve member 112, intermediate driving member 128 is caused to rotate and effect rotation of the lower valve member 126 about the axis A-A. The lower side of the lower valve member 126 has surfaces provided therein which engage a lower axle shaft or pin 138 which is secured in recess 140 provided in the valve block. Thus, the shaft or pin 138 secures and guides the lower valve member 126 for maintaining alignment and rotation about axis A-A.

The valve block has formed integrally therewith an outlet passage having an "S" curved or contra-curvature configuration, also referred to as a "gooseneck", and is denoted by reference 142 in FIG. 5. The gooseneck has an outlet passage 144 formed therein with the lower end thereof communicating with the spherical valve chamber 124 and the upper end terminating in a flange 146. Flange 146 has an optional outlet fitting 520 secured thereon by fasteners (not shown in FIG. 5) and sealed on thereabout with a suitable seal ring 147.

The lower valve member 126 has a cross-passage indicated generally at 160 which will hereinafter be described in detail with respect to operation of the valve. It will be understood that the gooseneck 144 may be formed integrally with the valve block 104 as for example by metal casting or molding.

With reference to FIGS. 4 and 5, it will be understood that in one position of the diverter valve, the cross-passage 160 in the lower valve 126 communicate with the lower outlet port 24' in the left-hand pressure vessel and upon rotation by 180°, communicates with the right-hand pressure vessel port 24", however, only the left-hand pressure vessel 12' is shown in FIG. 5.

With reference to FIGS. 3, 4 and 5, the upper driving member 114 extends outwardly of the diverter valve block 104 and has an operating lever or handle 158 attached thereto for, upon rotation, effecting rotation of member 114.

Figure 6:
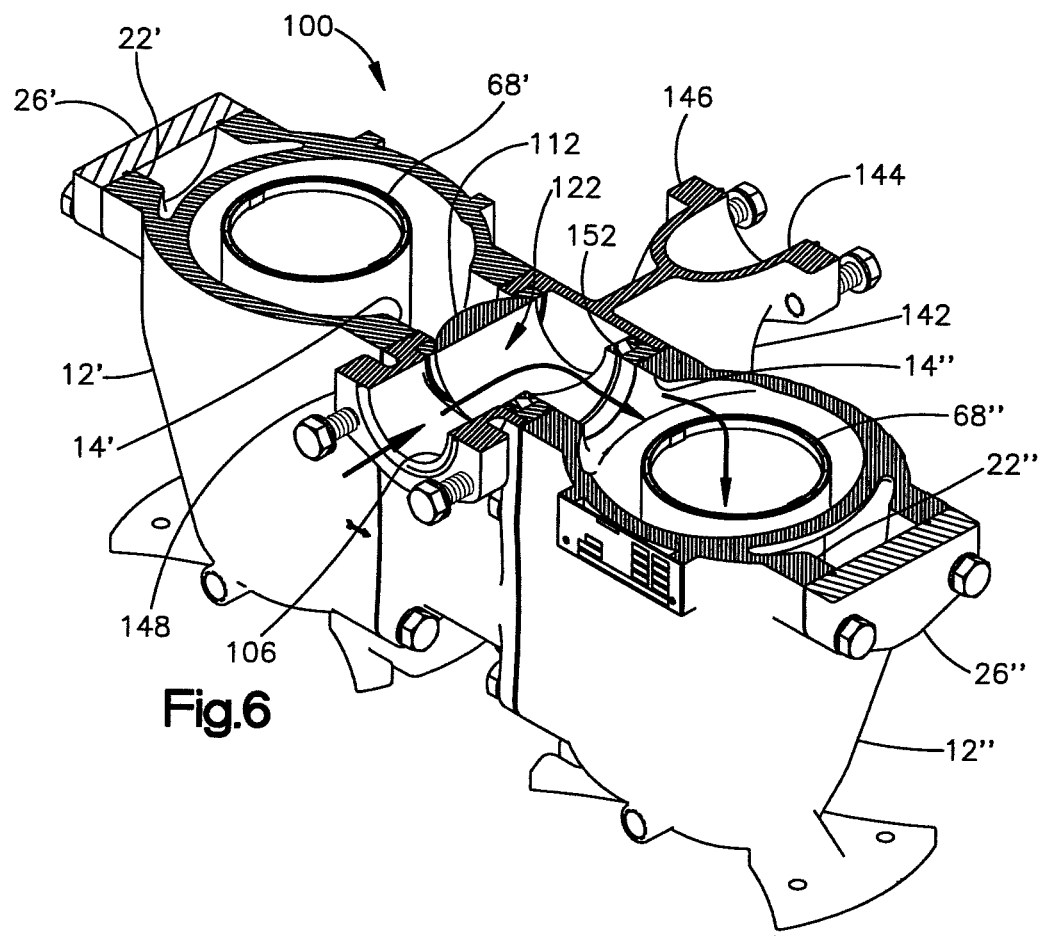
FIG. 6 is a perspective view of the assembly of FIG. 3 sectioned along section indicating lines 6-6 of FIG. 3 which shows the diverter valve positioned such that the upper valve member of the diverter valve directs flow from the diverter valve to the inlet of the right-hand filter pressure vessel.
Figure 7:
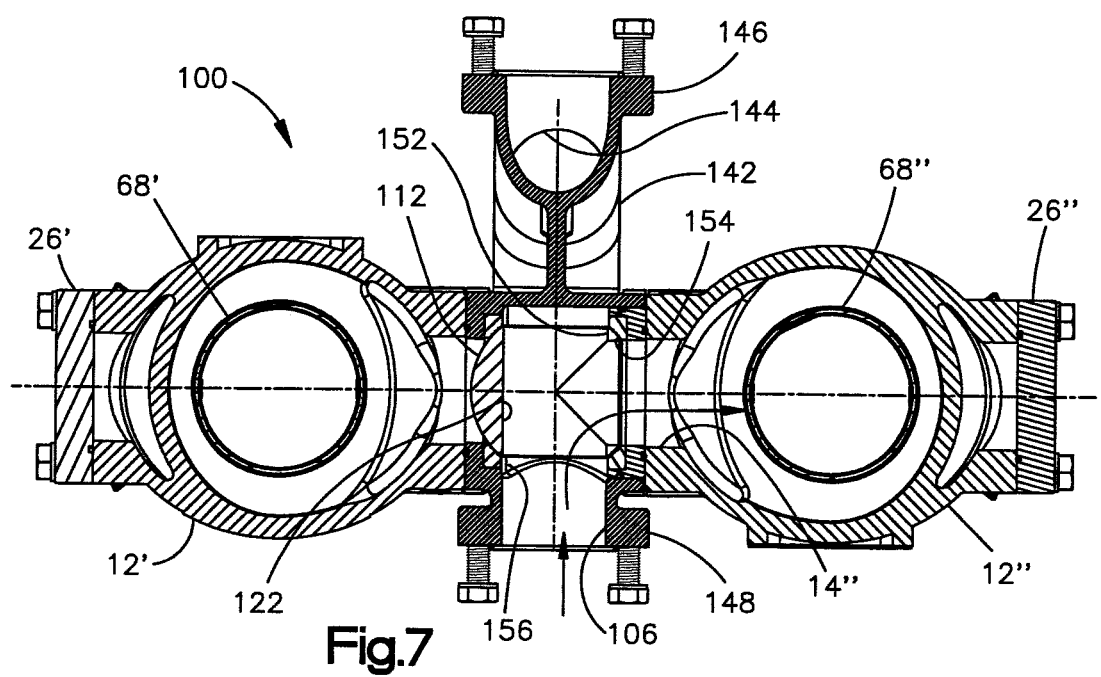
FIG. 7 is a plan view or top view of the section of FIG. 6.

With reference to FIGS. 6 and 7, the upper ball valve member 112 is shown in a position wherein the cross-passage 122 therethrough has one end 152 blocked and the opposite end 156 aligned with the inlet passage 106; and, valve member 112 has a passage 154 formed therein at right angles to and communicating with the cross-passage 122, passage 154 being aligned in FIGS. 6 and 7 with the passage 14" of the pressure vessel 12" to provide inlet flow to the interior of the filter 68".

Figure 8:
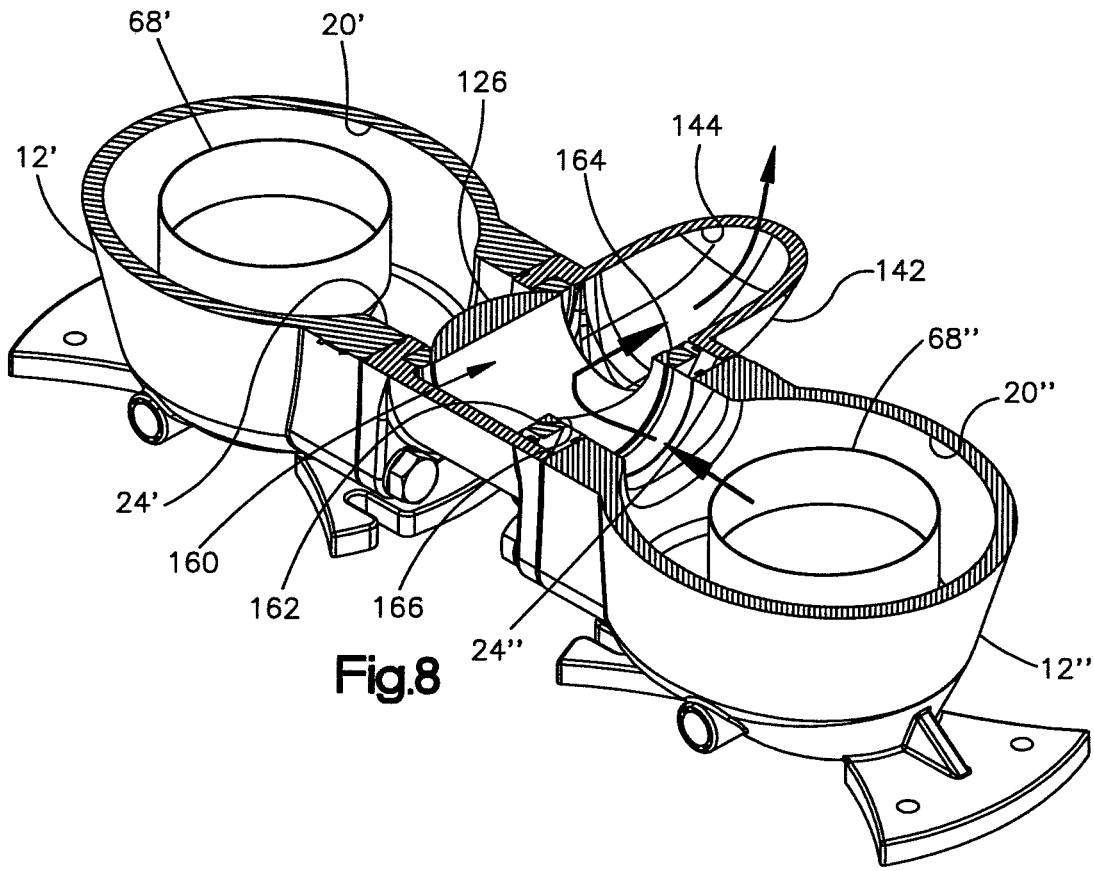
FIG. 8 is a perspective view of the system of FIGS. 3 and 4 sectioned along section indicating lines 8-8 of FIG. 4 which shows the lower valve member of the diverter valve positioned to direct flow out of the right-hand filter member of FIG. 4 to the system outlet.
Figure 9:
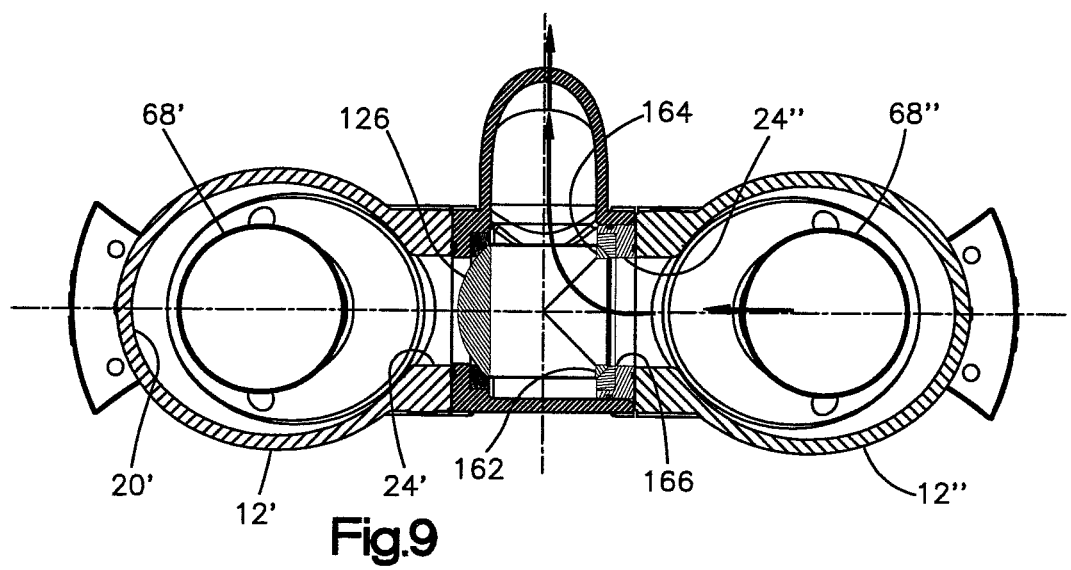
FIG. 9 is a plan view or top view of the section of FIG. 8.

Referring to FIGS. 8 and 9, the diverter valve 102 is shown in the same rotated position as in FIGS. 6 and 7 with the lower discharge or outlet valve member 126 having a cross-passage, denoted generally by reference numeral 160 having one end 162 blocked, with the opposite end 164 thereof aligned with the lower end of passage 144 in the gooseneck for discharge therethrough. The right angle passage 166 formed in valve member 126, and which communicates with cross-passage 122, is aligned with the passage 24" of the pressure vessel 12" to receive discharge of filtrate from the filter 68" through the passage 24".

Figure 10:
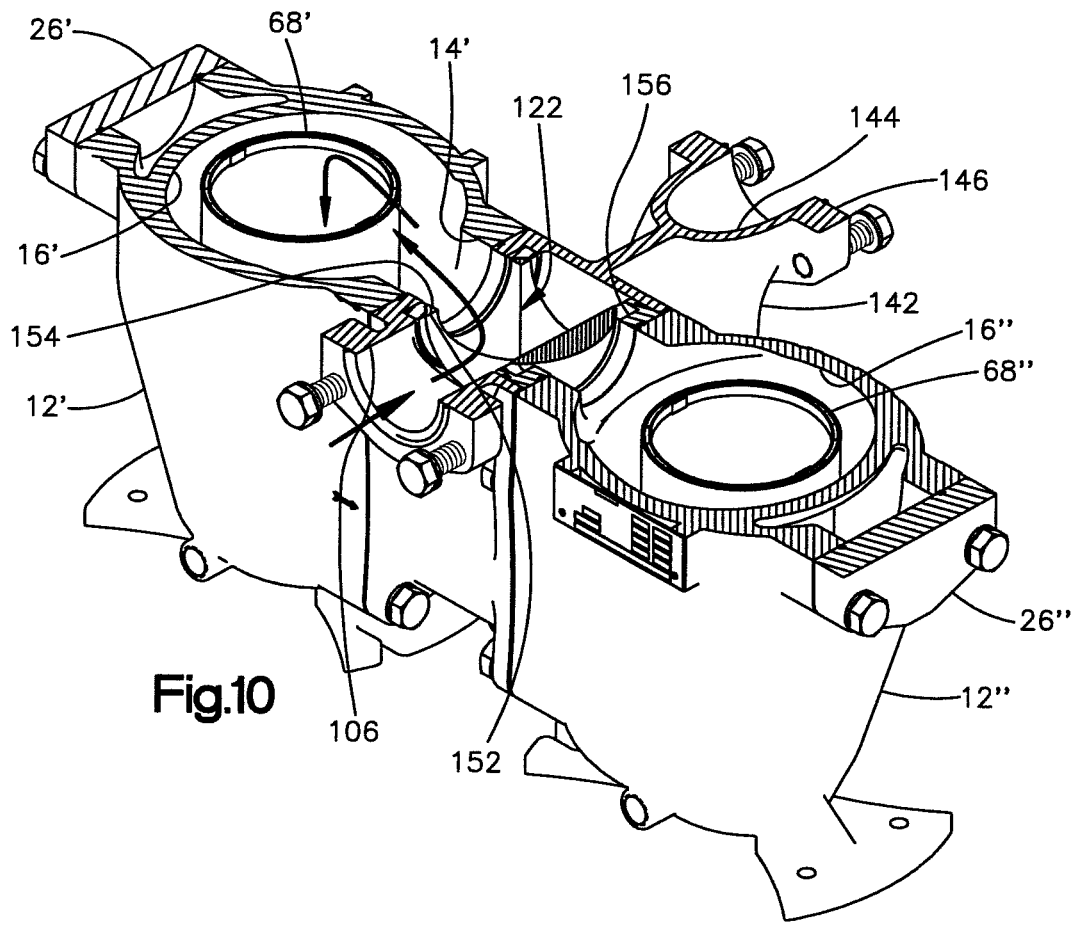
FIG. 10 shows the diverter valve rotated 180° to a position to direct inlet flow to the left-hand filter pressure vessel of the assembly of FIG. 13.
Figure 11:
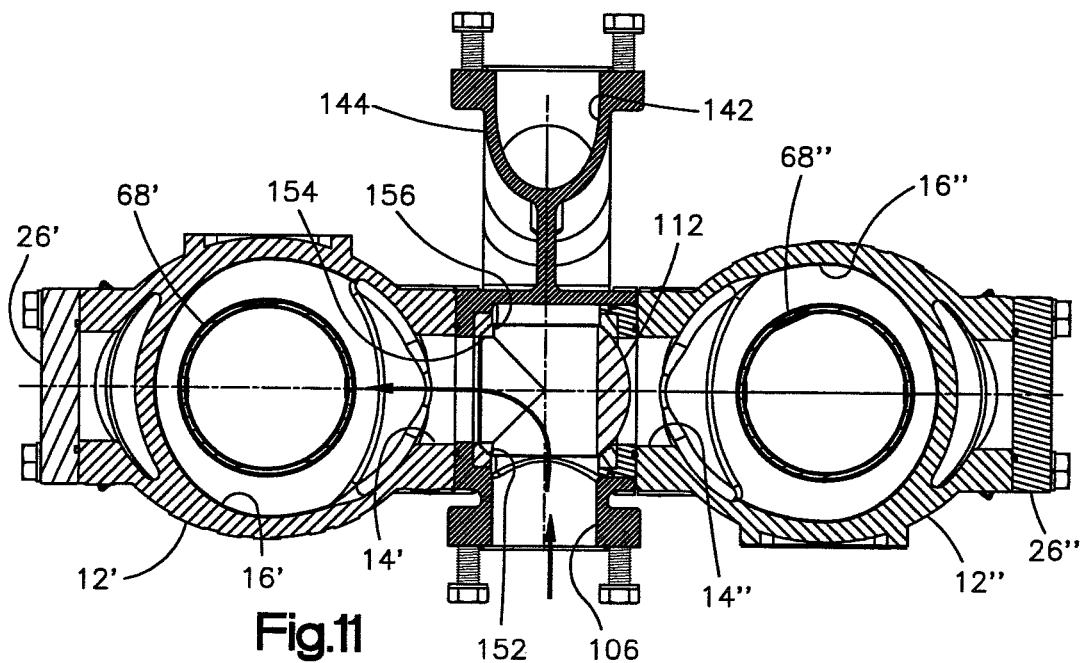
FIG. 11 is a plan view or top view of FIG. 10.

Referring to FIGS. 10 and 11, inlet upper valve member 112 is shown rotated to a position 180° opposite of the position shown in FIGS. 6 and 7, wherein the cross-passage therein indicated generally at 122 has the end 156 thereof blocked; and, the opposite end 152 is aligned with the inlet passage 106 and inlet fitting 580 (see FIG. 3). The right angle passage 154 communicates with the inlet passage 14' of the left-hand pressure vessel 12', thus providing flow from the inlet passage 106 to the left-hand filter 68' in pressure vessel 12'. It will be understood that with the valve member 112 in the position shown in FIGS. 10 and 11, the operating handle 158 would appear rotated 180° from the position shown in FIG. 3.

Referring to FIGS. 12 and 13, the diverter valve 102 with the lower valve member 126 is shown in the same position as the valve 112 in FIGS. 10 and 11, wherein the end 164 of the cross-passage 160 is blocked and the opposite end 162 is aligned with the passage 144 in the gooseneck 142 for providing exit or discharge of the filtrate from the filter 68' in pressure vessel 12'; and, the 90° or right angle passage 166 is aligned with the discharge passage 24' of the pressure vessel 12' to receive filtrate flow from the filter assembly 68'.

With reference to FIGS. 6-13, the inlet and filtrate outlet chambers respectively 16', 16", and 20', 20" of pressure vessels 12' and 12" are shown having been cast in an elliptical cross-section. In the present practice, this has been found to facilitate flow and provide a reduction in pressure drop from the inlet to the outlet.

The present disclosure thus provides a filtration unit having the pressure vessel cast as a one-piece unit with an offset bulkhead separating the fluid inlet chamber, which communicates exclusively with the inlet side of the filter therein, and the filtrate outlet chamber which communicates solely with the outlet side of the filter unit, and has an upper and lower outlet port on opposite sides of the pressure vessels, and the pressure vessel with offset bulkhead is cast in a one-piece form.

A removable closure member over the lower outlet configures the filter assembly for simplex filtering operation. Simply relocating the closure member to the upper outlet on the opposite side of a pair of the pressure vessels readily configures the pair for attachment to opposite sides of a central diverter valve for duplex operation without rework of the pressure vessels.

The central diverter valve provides for directing inlet flow to either of the duplicate filters thereby allowing de-pressurization and replacement of the filter element in one pressure vessel while maintaining flow to the other pressure vessel.

The exemplary embodiment has been described and illustrated with reference to the drawings. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fluid filtration assembly comprising:
   (a) a pressure vessel having a one-piece housing having a fluid entrance chamber having an entrance port therein and a fluid filtration chamber with an integrally formed offset dividing wall between the entrance chamber and the filtration chamber and having a first and second filtrate exit port therein disposed on opposite sides of the one-piece housing with each communicating exclusively with the filtration chamber wherein the entrance port and first filtrate exit port are aligned;
   (b) a filter access opening in the fluid entrance chamber having a removable closure or cover disposed thereover;
   (c) a filter subassembly disposed through an aperture formed in the dividing wall with an inlet side of the subassembly communicating exclusively with the fluid entrance chamber and a filtrate outlet side of the subassembly communicating exclusively with the filtration chamber;
   (d) wherein the second exit port has a separate removable closure or lid disposed thereover for simplex filter operation; and
   (e) wherein, upon relocating the removable closure or lid on the second filtrate exit port and relocating same to cover the first filtrate exit port on a pair of identical ones of the pressure vessels, each with filter subassemblies therein, the pair of identical pressure vessels are thus configured without rework for attachment to a central diverter valve for duplex filtering operation.

2. The assembly of claim 1, wherein the filter subassembly includes a porous basket having filter media disposed therein.

3. The assembly of claim 1, wherein the housing is a one-piece cast metal member with the first exit port below the second exit port and the dividing wall offset.

4. The assembly of claim 1, wherein the entrance chamber entrance port and the first exit port each have a common flanged fitting removably attached thereto for attachment to the fluid conduit.

5. The assembly of claim 4, wherein each common flanged fitting is attached with removable fasteners.

6. The assembly of claim 1, wherein the housing has an integrally formed therewith a generally planar base portion.

7. The assembly of claim 1, wherein the filter subassembly is aligned with the filter access opening to facilitate removal thereof.

8. The assembly of claim 1, wherein the removable cover for the filter access opening is attached to the housing with threaded fasteners.

9. The assembly of claim 1, wherein the entrance chamber entrance port and second filtrate exit port have planar attachment surfaces are disposed in a common plane.

10. A duplex fluid filtration assembly comprising:
    (a) a pair of identical one-piece filter housings having a fluid entrance chamber having an entrance port therein and a fluid filtration chamber with an integrally formed offset dividing wall between the entrance chamber and the filtration chamber and having a first and second filtrate exit port therein disposed aligned on opposite sides of the housing each communicating exclusively with the filtration chamber wherein the entrance port and first filtrate exit port are aligned and the second filtrate exit port has a removable closure disposed thereover for simplex fluid filtration, wherein the closure for the second exit port is removed and repositioned to cover the first filtrate exit port of each of the pair of housings for duplex fluid filtration;
    (b) a filter subassembly disposed through the aperture of the dividing wall of each of the pair of housings with the inlet side of the subassembly communicating exclusively with the respective fluid entrance chamber and the filtrate outlet side communicating exclusively with the filtration chamber;
    (c) a diverter valve assembly having a valve block with a first upper rotatable valve member and a second rotatable lower valve member disposed therein and commonly rotatable about a common axis by an operating member extending externally of the valve block, wherein the valve block has a system inlet port adapted for connection to a fluid supply conduit and a system outlet port adapted for connection to a filtrate conduit and a first and second oppositely disposed outlet port, each positioned to communicate respectively with the fluid entrance port of the fluid entrance chamber of one of the pair of housings and pairs of oppositely disposed inlet ports each positioned to communicate respectively with one of the lower fluid outlet ports of the filtration chamber of one of the pairs of housings and the valve block includes an outlet port adapted for connection to a filtrate discharge conduit, wherein the diverter valve in a first position is operable to have the upper rotatable valve member communicate the valve block system inlet port exclusively with one of the pair of fluid entrance chamber inlet ports and the lower rotatable valve member communicate the filtrate outlet port of the one of the pair of filtrate chambers with the valve system outlet port; and, wherein the diverter valve upon rotation to a second position is operable to have the upper rotatable valve member communicate the valve block system inlet port exclusively with the other of the pair of fluid entrance chamber inlet ports and the lower rotatable valve member communicates the other filtration chamber outlet port with the valve block system outlet port; and,
    (d) wherein the diverter valve ports have planar attachment surfaces in a common plane for each filter housing.

11. The duplex filtration assembly of claim 10, wherein the first and second rotatable valve members have a spherical configuration.

12. The duplex filtration assembly of claim 10, wherein the system inlet port and the system outlet port are disposed on opposite sides of the valve block.

13. A fluid filtration assembly comprising:
    (a) a one-piece pressure vessel having formed integrally therewith
       (i) an inlet chamber and a fluid inlet port communicating exclusively therewith,
       (ii) a filtrate outlet chamber and first and second outlet ports on opposite sides of the pressure vessel communicating exclusively with the filtrate chamber wherein the fluid inlet port and the first outlet port are disposed on opposite sides of the pressure vessel and are aligned,
       (iii) an offset bulkhead isolating the inlet chamber from the filtrate chamber,
    (b) a removable fluid filter subassembly received through an aperture formed in the bulkhead, wherein the inlet side of the filter subassembly communicates exclusively with the inlet chamber and the filtrate outlet side thereof communicates exclusively with the filtrate outlet chamber;

(c) an access opening in the inlet chamber and aligned with the aperture in the bulkhead; and, a removable closure/lid disposed over the access opening for permitting access to and removal of the filter subassembly;

(d) a removable closure disposed over the second filtrate chamber outlet port, wherein, upon connection of the fluid inlet port to a source of fluid flow, the assembly is operative to provide filtrate flow to the first filtrate outlet port;

(e) wherein upon relocation of the closure from the second filtrate outlet port to the first filtrate outlet port on each of a pair of identical ones of the pressure vessel assemblies, the pressure vessel assemblies are adapted for conversion from simplex to duplex filtration; and, (f) a diverter valve having an inlet communicating with a first and second outlet disposed on opposite sides thereof and a common outlet communicating with a first and second inlet disposed respectively on the opposite sides thereof, wherein one of the pair of the pressure vessels has its inlet connected to the outlet on one side of the valve and its outlet connected to the corresponding inlet on the same side of the valve; and, the other of the pair of pressure vessels has its inlet connected to the outlet on the side of the valve opposite the one side and its outlet connected to the valve inlet on the same side of the valve, wherein the valve is movable between a first valve position directing flow from the inlet into only one of the pair of pressure vessels and filtrate therefrom to the valve common outlet and a second valve position directing flow from the inlet to only the other of the pair of pressure vessels and filtrate therefrom to the common outlet.

14. The fluid filtration assembly of claim 13, wherein the pressure vessel is formed integrally of cast metal.

15. The fluid filtration assembly of claim 13, wherein one of the first and second filtrate chamber outlet ports is disposed on the same side and below the inlet chamber inlet port.

16. The fluid filtration assembly of claim 13, wherein the diverter valve includes a rotatable inlet valve member and a rotatable outlet valve member commonly rotated between the first and second positions by a user movable member.

17. The fluid filtration assembly of claim 16, wherein the rotatable inlet and outlet valve members have a spherical configuration.

18. The fluid filtration assembly of claim 13, wherein the pressure vessel inlet chamber and filtrate outlet chamber have an ellipsoidal shape in cross-section.

19. The fluid filtration assembly of claim 13, wherein the inlet chamber inlet port and the first and second filtrate chamber outlet ports with the removable closure have a common boss with a planar surface.

* * * * *